(12) United States Patent
Harada

(10) Patent No.: US 8,542,327 B2
(45) Date of Patent: Sep. 24, 2013

(54) LIQUID CRYSTAL DISPLAY DEVICE

(75) Inventor: Kazuyuki Harada, Ishikawa-gun (JP)

(73) Assignee: Japan Display Central Inc., Saitama (JP)

( * ) Notice: Subject to any disclaimer, the term of this patent is extended or adjusted under 35 U.S.C. 154(b) by 848 days.

(21) Appl. No.: 12/236,169

(22) Filed: Sep. 23, 2008

(65) Prior Publication Data

US 2009/0096946 A1   Apr. 16, 2009

(30) Foreign Application Priority Data

Oct. 16, 2007   (JP) ................................. 2007-269433

(51) Int. Cl.
*G02F 1/1343* (2006.01)
*G02F 1/136* (2006.01)

(52) U.S. Cl.
USPC ................................. 349/38; 349/39; 349/41

(58) Field of Classification Search
USPC .............................................. 349/38, 39, 41
See application file for complete search history.

(56) References Cited

U.S. PATENT DOCUMENTS

| | | | | |
|---|---|---|---|---|
| 6,008,787 | A * | 12/1999 | Kondoh ............................ | 345/97 |
| 2005/0046763 | A1 * | 3/2005 | Ono et al. ........................ | 349/39 |
| 2005/0169573 | A1 * | 8/2005 | Yokouchi et al. ............... | 385/22 |
| 2005/0225708 | A1 * | 10/2005 | Oke et al. ........................ | 349/139 |
| 2006/0118827 | A1 * | 6/2006 | Ohwada et al. ................. | 257/212 |
| 2008/0024712 | A1 * | 1/2008 | Kim .................................. | 349/144 |
| 2008/0088785 | A1 * | 4/2008 | Segawa et al. ................. | 349/141 |

FOREIGN PATENT DOCUMENTS

| | | |
|---|---|---|
| JP | 7-128683 | 5/1995 |
| JP | 2000-47250 | 2/2000 |
| JP | 2000-56320 | 2/2000 |
| JP | 2000-81637 | 3/2000 |
| JP | 2001-174784 | 6/2001 |
| JP | 2002-287712 | 10/2002 |
| JP | 2005-107535 | 4/2005 |
| JP | 2006-139295 | 6/2006 |

OTHER PUBLICATIONS

Notice of Reasons for Rejection issued by the Japanese Patent Office on Dec. 8, 2009, for Japanese Patent Application No. 2007-269433, and English-language translation thereof.

* cited by examiner

*Primary Examiner* — Mark Robinson
*Assistant Examiner* — Jerry Blevins
(74) *Attorney, Agent, or Firm* — Finnegan, Henderson, Farabow, Garrett & Dunner, LLP

(57) ABSTRACT

A liquid crystal display device, which is configured such that a liquid crystal layer is held between a pair of substrates, includes scanning lines extending in a row direction of matrix-arrayed pixels; and signal lines extending in a column direction of the pixels, wherein a pixel between a pair of ones of the signal lines, which neighbor in the row direction, includes, on an identical one of the pair of substrates, a first electrode which is connected to one of the pair of ones of the signal lines, and a second electrode which is opposed to the first electrode via an interlayer insulation film and is connected to the other of the pair of ones of the signal lines.

18 Claims, 6 Drawing Sheets

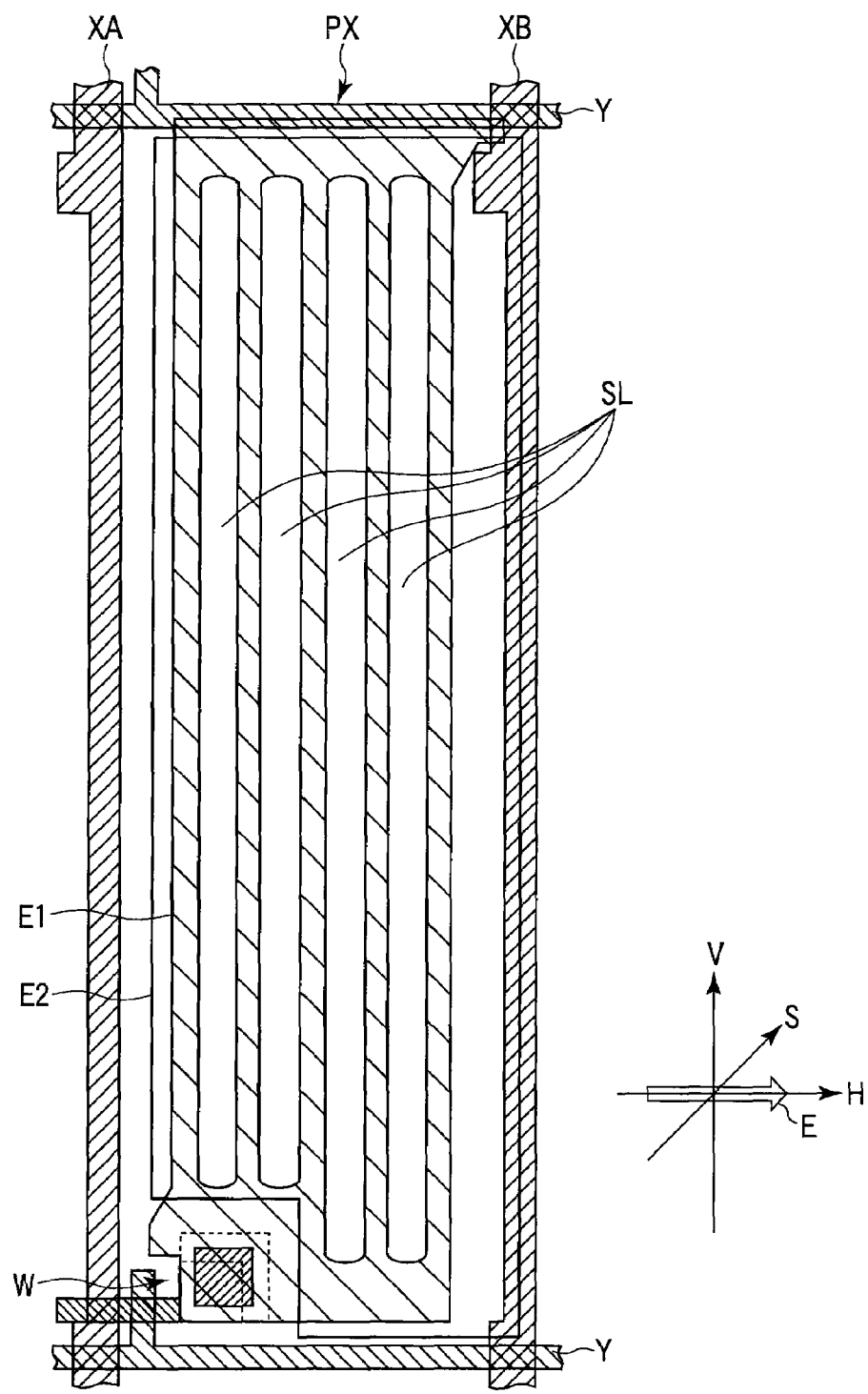
F I G. 3

LIQUID CRYSTAL DISPLAY DEVICE

CROSS-REFERENCE TO RELATED APPLICATIONS

This application is based upon and claims the benefit of priority from prior Japanese Patent Application No. 2007-269433, filed Oct. 16, 2007, the entire contents of which are incorporated herein by reference.

BACKGROUND OF THE INVENTION

1. Field of the Invention

The present invention relates generally to a liquid crystal display device, and more particularly to a liquid crystal display device which is configured to have a pair of electrodes on one of substrates that constitute a liquid crystal display panel, the pair of electrodes being opposed to each other via an interlayer insulation film.

2. Description of the Related Art

In recent years, flat-panel display devices have vigorously been developed, and liquid crystal display devices, above all, have attracted attention because of advantages of light weight, small thickness and low power consumption. In particular, in an active matrix liquid crystal display device in which a switching element is built in each of pixels, attention has been paid to the structure which mainly makes use of a transverse electric field (including a fringe electric field) of an IPS (In-Plane Switching) mode or an FFS (Fringe Field Switching) mode (see, e.g. Jpn. Pat. Appln. KOKAI Publication No. 2005-107535 and Jpn. Pat. Appln. KOKAI Publication No. 2006-139295).

The liquid crystal display device of the IPS mode or FFS mode includes a pixel electrode and a common electrode which are formed on an array substrate, and liquid crystal molecules are switched by a transverse electric field that is substantially parallel to the major surface of the array substrate. In addition, polarizer plates, which are disposed such that their axes of polarization intersect at right angles, are disposed on the outer surfaces of the array substrate and a counter-substrate. By this disposition of the polarizer plates, a black screen is displayed, for example, at a time of non-application of voltage. With the application of a voltage corresponding to a video signal to the pixel electrode, the light transmittance (modulation ratio) gradually increases and a white screen is displayed. In this liquid crystal display device, since the liquid crystal molecules rotate in a plane that is substantially parallel to the major surface of the substrate, the polarization state is not greatly influenced by the incidence direction of transmissive light. Hence, the viewing angle dependency is small, and wide viewing-angle characteristics are obtained.

Jpn. Pat. Appln. KOKAI Publication No. 2000-047250, for instance, discloses a technique for solving such a problem that a display image in an IPS system is influenced by an electric field which occurs due to a variation in potential of a signal line after data write in pixels, or an electric field which occurs due to a variation in potential of neighboring signal lines. According to this technique, a wide pixel section area is secured by sharing a signal line and a pixel electrode, without disposing wiring for preventing this influence.

Jpn. Pat. Appln. KOKAI Publication No. 2001-174784, for instance, discloses a technique for preventing a potential variation from occurring in a pixel voltage of each pixel when a voltage, which is applied to each scanning signal line, has changed from a select scan voltage to a non-select scan voltage. In particular, as regards an IPS system liquid crystal display module, this document discloses a technique for decreasing a maximum amplitude level of a gradation voltage which is applied to a pixel electrode.

In a liquid crystal mode which mainly makes use of a transverse electric field, it is desired to shield an electric field from a signal line, which adversely affects a display image, and to suppress an unwanted parasitic capacitance, thereby improving display quality.

BRIEF SUMMARY OF THE INVENTION

The present invention has been made in consideration of the above-described problems, and the object of the invention is to provide a liquid crystal display device which can display an image with a good display quality, without causing a decrease in pixel aperture ratio.

According to a first aspect of the present invention, there is provided a liquid crystal display device which is configured such that a liquid crystal layer is held between a pair of substrates and one of the substrates includes a pair of electrodes which are opposed via an interlayer insulation film, comprising: scanning lines extending in a row direction of matrix-arrayed pixels; signal lines extending in a column direction of the pixels; and a storage capacitance element which is formed between neighboring ones of the signal lines in each of the pixels.

According to a second aspect of the present invention, there is provided a liquid crystal display device which is configured such that a liquid crystal layer is held between a pair of substrates, comprising: scanning lines extending in a row direction of matrix-arrayed pixels; and signal lines extending in a column direction of the pixels, wherein a pixel between a pair of ones of the signal lines, which neighbor in the row direction, includes, on an identical one of the pair of substrates, a first electrode which is connected to one of the pair of ones of the signal lines, and a second electrode which is opposed to the first electrode via an interlayer insulation film and is connected to the other of the pair of ones of the signal lines.

The present invention can provide a liquid crystal display device which can display an image with a good display quality, without causing a decrease in pixel aperture ratio.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a plan view which schematically shows an example of the structure of one pixel of an array substrate, which is applicable to the liquid crystal display device shown in FIG. 1;

DETAILED DESCRIPTION OF THE INVENTION

A liquid crystal display device according to an embodiment of the present invention will now be described with reference to the accompanying drawings. An FFS mode liquid crystal display device is described below as an example of a liquid crystal display device of a liquid crystal mode in which a pair of electrodes are provided on one of substrates, and liquid crystal molecules are switched by mainly using a transverse electric field that is produced between these electrodes (i.e. a horizontal electric field which is substantially parallel to the substrate surface).

Figure 1:
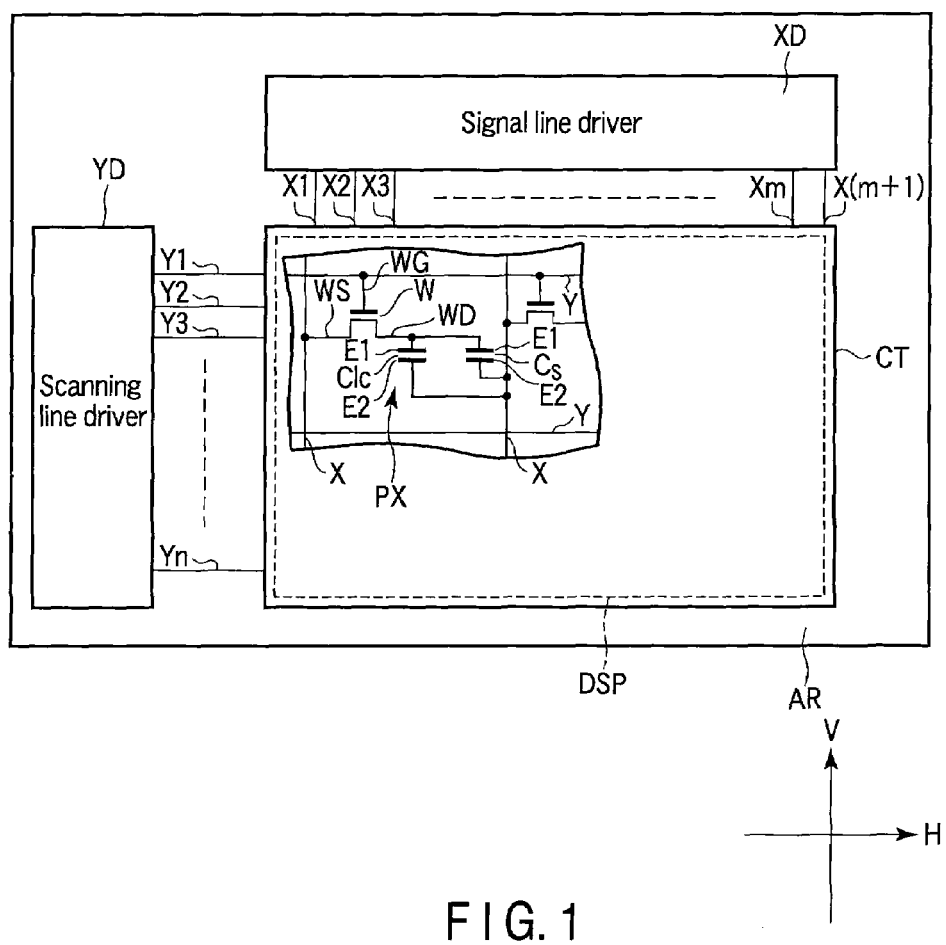
FIG. 1 schematically shows the structure of a liquid crystal display device of a liquid crystal mode which makes use of a transverse electric field according to an embodiment of the present invention.
Figure 2:
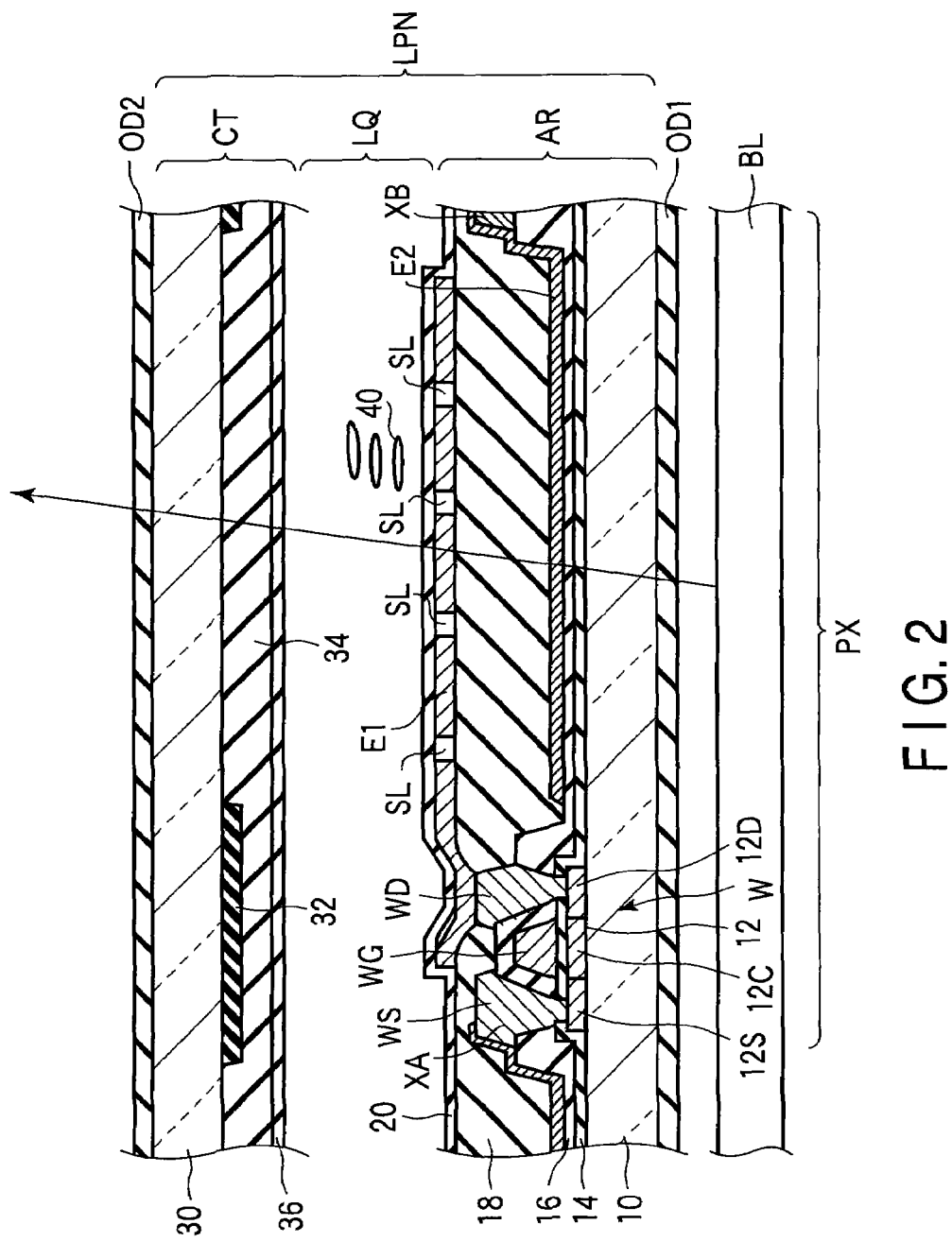
FIG. 2 is a cross-sectional view which schematically shows an example of the structure of one pixel of the liquid crystal display device shown in FIG. 1.

As is shown in FIG. 1 and FIG. 2, the liquid crystal display device is an active matrix type liquid crystal display device, and includes a liquid crystal display panel LPN. The liquid crystal display panel LPN includes an array substrate AR, a counter-substrate CT which is disposed to be opposed to the array substrate AR, and a liquid crystal layer LQ which is held between the array substrate AR and the counter-substrate CT. The liquid crystal display panel LPN includes an active area DSP which displays an image. The active area DSP is composed of pixels PX which are arrayed in a matrix of m×n (m and n are natural numbers).

In the present embodiment, a description is given of a liquid crystal display device including a transmissive liquid crystal display panel LPN. However, the invention is not limited to a transmissive type, and may be applied to a reflective type. The transmissive liquid crystal display device includes a backlight unit BL which is disposed on the array substrate AR side of the liquid crystal display panel LPN. The liquid crystal display device including the transmissive liquid crystal display panel LPN is configured to display an image by selectively transmitting backlight from the backlight unit BL.

A more specific structure of the liquid crystal display device is described below.

The array substrate AR is formed by using an insulating substrate 10 with light transmissivity, such as a glass plate or a quartz plate. Specifically, the array substrate AR includes, in the active area DSP, an (m×n) number of first electrodes E1 which are disposed in association with the respective pixels PX; an n-number of scanning lines Y (Y1 to Yn) which extend in a row direction H of the pixels PX; at least an (m+1) number of signal lines X (X1 to X(m+1)) which extend in a column direction V of the pixels PX; an (m×n) number of switching elements W which are disposed in regions including intersections between the scanning lines Y and signal lines X in the respective pixels PX; and an (m×n) number of second electrodes which are disposed in the respective pixels PX.

That surface of the array substrate AR, which is put in contact with the liquid crystal layer LQ, is covered with an alignment film 20.

Each of the switching elements W is composed of, e.g. an n-channel thin-film transistor, which includes a semiconductor layer 12 that is disposed on the insulating substrate 10. The semiconductor layer 12 can be formed of, e.g. polysilicon or amorphous silicon. In this example, the semiconductor layer 12 is formed of polysilicon. The semiconductor layer 12 includes a source region 12S and a drain region 12D which are disposed on both sides of a channel region 12C. The semiconductor layer 12 is covered with a gate insulation film 14.

A gate electrode WG of the switching element W is connected to the scanning line Y (or formed integral with the scanning line Y). The gate electrode WG and the scanning line Y are disposed on the gate insulation film 14. The gate electrode WG and scanning line Y are covered with a first interlayer insulation film 16. The gate insulation film 14 and first interlayer insulation film 16 can be formed of an inorganic material such as silicon oxide or silicon nitride.

A source electrode WS and a drain electrode WD of the switching element W are disposed on the first interlayer insulation film 16 on both sides of the gate electrode WG. The source electrode WS is connected to the signal line X (or formed integral with the signal line X) and is put in contact with the source region 12S of the semiconductor layer 12 via a contact hole which penetrates the gate insulation film 14 and first interlayer insulation film 16. The drain electrode WD is put in contact with the drain region 12D of the semiconductor layer 12 via a contact hole which penetrates the gate insulation film 14 and first interlayer insulation film 16. The source electrode WS, drain electrode WD and signal line X are covered with a second interlayer insulation film 18.

In the case where the polysilicon thin-film transistor having the above-described structure is used, the second interlayer insulation film 18 can be formed of an organic material (resin material). In the case where an amorphous silicon thin-film transistor is used, the second interlayer insulation film 18 can be formed of a thin film of an inorganic material, such as a nitride film.

The n-number of scanning lines Y (Y1 to Yn) are arranged in the column direction V. The (m+1) number of signal lines X (X1 to X(m+1)) are arranged in the row direction H. Specifically, each of the (m×n) number of pixels PX is positioned between a pair of signal lines X which neighbor in the row direction.

In each pixel PX, the first electrode E1 and second electrode E2 are opposed via an interlayer insulation film. The first electrode E1 and second electrode E2 function as a storage capacitance element which is formed between neighboring signal lines.

In the example shown in FIG. 2, the first electrode E1 and second electrode E2 are opposed via the second interlayer insulation film 18. Specifically, the first electrode (upper electrode) E1 is disposed in an island shape on the second interlayer insulation film 18, and is connected to one of the paired signal lines, XA, which are disposed on both sides of the pixel PX. The second electrode (lower electrode) E2 is disposed in an island shape under the second interlayer insulation film 18, that is, between the first interlayer insulation film 16 and second interlayer insulation film 18, and is connected to the other of the paired signal lines, XB, which are disposed on both sides of the pixel PX.

The first electrode E1 is electrically connected to the drain electrode WD via a contact hole which penetrates the second interlayer insulation film 18, and is electrically connected to the signal line XA via the switching element W of each pixel PX. In addition, the second electrode E2 is connected to the signal line XB that is spaced apart from the signal line XA, to which the first electrode E1 is connected, and that neighbors the signal line XA in the row direction H. Specifically, an edge of the second electrode E2 overlaps and contacts the signal line XB, and the second electrode E2 and the signal line XB are electrically connected. According to this structure, the first electrode E1 and second electrode E2 function to form a liquid crystal capacitance Clc therebetween, and also function as a storage capacitance element which forms a storage capacitance Cs for storing the liquid crystal capacitance Clc.

The first electrode E1 and second electrode E2 are formed of a light-transmissive electrically conductive material such as indium tin oxide (ITO) or indium zinc oxide (IZO).

Further, in the vicinity of the active area DSP, the liquid crystal display device includes at least a part of a scanning line driver YD which is connected to the n-number of scanning lines Y and at least a part of a signal line driver XD which is connected to the (m+1) number of signal lines X. The scanning line driver YD and signal line driver XD may be formed on the array substrate AR.

The scanning line driver YD successively supplies scanning signals (driving signals) to the n-number of scanning lines Y on the basis of the control by a controller CNT. The scanning signal is a signal for controlling ON/OFF of the switching elements W which are connected to each scanning line Y. Specifically, when a high-level scanning signal is supplied to the scanning line Y, the switching elements W that are connected to this scanning line Y are turned on. When a low-level scanning line is supplied to the scanning line Y, the switching elements W that are connected to this scanning line Y are turned off.

The signal line driver XD supplies, under the control of the controller CNT, video signals (driving signals) to the (m+1) number of signal lines X at a timing when the switching elements W of each row are turned on by the scanning signal.

The signal line driver XD has the function of a potential setting unit which sets the pixels PX of each row at predetermined pixel potentials. Specifically, at a time of supplying a video signal to each signal line X, the signal line driver XD outputs such a signal voltage that the potential of one of the paired signal lines, between which the associated pixel PX is interposed, is set at a pixel potential which is determined with reference to the potential of the other signal line.

On the other hand, the counter-substrate CT is formed by using an insulating substrate 30 with light transmissivity, such as a glass plate or a quartz plate. Specifically, in a color-display-type liquid crystal display device, as shown in FIG. 2, the counter-substrate CT includes, on an inner surface of the insulating substrate 30, i.e. a surface opposed to the liquid crystal layer LQ, a black matrix 32 which divides the pixels PX, and a color filter layer 34 which is disposed in each pixel PX which is surrounded by the black matrix 32. The color filter layer 34 may be disposed on the array substrate AR side. Further, the counter-substrate CT may be configured to include a shield electrode for reducing the influence of an external electric field, and an overcoat layer which is disposed with such a relatively large film thickness as to planarize irregularities on the surface of the color filter layer 34.

The black matrix 32 is disposed on the insulating substrate 30 so as to be opposed mainly to wiring portions such as the scanning lines Y, signal lines X and switching elements W, which are provided on the array substrate AR. In the case where these wiring portions are disposed at a distance from a modulation region which is affected by an electric field between the first electrode and second electrode, it is desirable that the black matrix 32 be disposed not only in the region opposed to the wiring portions, but also over a more sufficient width. Thereby, leakage of light can be prevented between the wiring portions and the modulation region.

The color filter layer 34 is disposed on the insulating substrate 30 and is formed of color resins of different colors, for example, the three primary colors of red, blue and green. The red color resin, blue color resin and green color resin are disposed in association with the red color pixel, blue color pixel and green color pixel, respectively.

That surface of the counter-electrode CT, which is in contact with the liquid crystal layer LQ, is covered with an alignment film 36.

The array substrate AR and counter-substrate CT having the above-described structures are disposed such that their alignment films 20 and 36 are opposed to each other, and are bonded by a sealant. A predetermined gap is created by spacers not shown (e.g. columnar spacers which are integrally formed of a resin material on one of the substrates) between the array substrate AR and counter-substrate CT. The liquid crystal layer LQ is formed of a liquid crystal composition including liquid crystal molecules 40 which are sealed in the gap that is created between the alignment film 20 of the array substrate AR and the alignment film 36 of the counter-substrate CT.

The liquid crystal molecules 40 included in the liquid crystal layer LQ are aligned by a restriction force which is caused by the alignment film 20 and alignment film 36. The rubbing directions of the alignment film 20 and alignment film 36 are parallel. Specifically, at a time of no electric field when no potential difference is created between the first electrode E1 and second electrode E2 (i.e. no electric field is produced between the first electrode E1 and second electrode E2), the liquid crystal molecules 40 are aligned such that their major axes are parallel to the rubbing direction of the alignment film 20 and alignment film 36.

The liquid crystal display device further includes an optical element OD1 which is provided on one of outer surfaces of the liquid crystal display panel LPN (i.e. that surface of the array substrate AR, which is opposite to the surface thereof that is in contact with the liquid crystal layer LQ), and an optical element OD2 which is provided on the other outer surface of the liquid crystal display panel LPN (i.e. that surface of the counter-substrate CT, which is opposite to the surface thereof that is in contact with the liquid crystal layer LQ).

Each of the optical elements OD1 and OD2 includes a polarizer plate and realizes, for example, a normally black mode in which the transmittance of the liquid crystal display panel LPN becomes minimum (i.e. a black screen is displayed) at a time of no electric field. Alternatively, each of the optical elements OD1 and OD2 may be configured to realize a normally white mode in which the transmittance of the liquid crystal display panel LPN becomes maximum (i.e. a white screen is displayed) at a time of no electric field. Each of the optical elements OD1 and OD2 may include a retardation plate.

In this liquid crystal display device, the first electrode E1 and second electrode E2 are formed in such a shape as to produce an electric field which affects the liquid crystal layer LQ. In the example shown in FIG. 2 and FIG. 3, the first electrode E1 is disposed so as to overlap the second electrode E2 via the second interlayer insulation film 18 between the signal lines XA and XB, and includes openings which expose the second electrode E2. In this example, the first electrode E1 includes a plurality of slits SL which are opposed to the second electrode E2. Each slit SL is formed such that its major axis crosses a rubbing direction S of the alignment film 20 and alignment film 36. The second electrode E2 has a substantially rectangular shape with no slit.

According to this structure, when a potential difference is created between the first electrode E1 and second electrode E2 (i.e. at a voltage application time when a voltage, which has a potential different from a reference potential that is a potential of the second electrode E2, is applied to the first electrode E1), an electric field E is produced between the first electrode E1 and second electrode E2 via the slits SL. The electric field E is formed in a direction substantially perpendicular to the edges of the slits SL. At this time, the liquid crystal molecules 40 are driven and aligned such that the direction of their major axes is varied from the rubbing direction S to the direction parallel to the electric field E.

In this manner, when the direction of the major axes of the liquid crystal molecules 40 varies from the rubbing direction S, the modulation ratio of light, which passes through the liquid crystal layer LQ, varies. Accordingly, backlight emanating from the backlight unit BL enters the liquid crystal display panel LPN via the first optical element OD1, and then part of the light passes through the second optical element OD2 on the basis of the modulation ratio of the liquid crystal layer LQ, thereby displaying a white screen. In short, the transmittance of the liquid crystal display panel LPN varies depending on the magnitude of the electric field E. In the liquid crystal mode that makes use of a transverse electric field, backlight is selectively passed in this manner, and an image is displayed.

As has been described above, according to the present embodiment, each pixel includes the storage capacitance element which is formed between the pair of neighboring signal lines. Specifically, the signal line functions also as a storage capacitance line (i.e. sharing of a signal line and a storage capacitance line). It is thus possible to suppress the occurrence of an electric field from the signal line, which adversely affects display, and to prevent a problem which occurs when a storage capacitance line, which is separate from the signal line, is disposed, that is, a problem relating to a capacitance between the signal line and the storage capacitance line. Thereby, an image with a good display quality can be displayed. Furthermore, since the storage capacitance line is needless, the pixel aperture ratio can be increased. Besides, since a power supply circuit for supplying a potential to the storage capacitance line is needless, the manufacturing cost can be reduced.

In the example shown in FIG. 3, each pixel PX has a substantially rectangular shape having a less length in the row direction H than in the column direction V.

Specifically, the first electrode E1 is disposed between a pair of signal lines, that is, between the signal line XA which mainly supplies a pixel potential to the own pixel PX, and the signal line XB which neighbors the signal line XA and supplies a reference potential of the own pixel PX. The first electrode E1 has a rectangular shape which is substantially elongated in the column direction V (i.e. in the direction parallel to the direction of extension of the signal line). As shown in FIG. 3, the first electrode E1 is so disposed as not to overlap the signal line XA in plan view. The first electrode E1 is connected to the signal line XA via the switching element W.

The first electrode E1 has a plurality of slits SL which are opposed to the second electrode E2 and are arranged in the row direction H. In this example, four slits SL are formed in the first electrode E1. Each slit SL has a major axis extending in the column direction V.

The second electrode E2 is spaced apart from the signal line XA and is disposed such that an edge on one side thereof overlaps the signal line XB. The second electrode E2 has a rectangular shape which is substantially elongated in the column direction V. Needless to say, the second electrode E2 is so disposed as not to overlap the signal line XA. The second electrode E2 is connected to only the signal line XB.

The rubbing direction S of the alignment film is set to be a direction crossing the row direction H (e.g. a direction at 45° to the row direction). The electric field E, which is produced between the first electrode E1 and second electrode E2, is substantially parallel to the row direction H.

In the pixel PX having the above-described structure, the pixel aperture ratio was about 66%.

Figure 4:
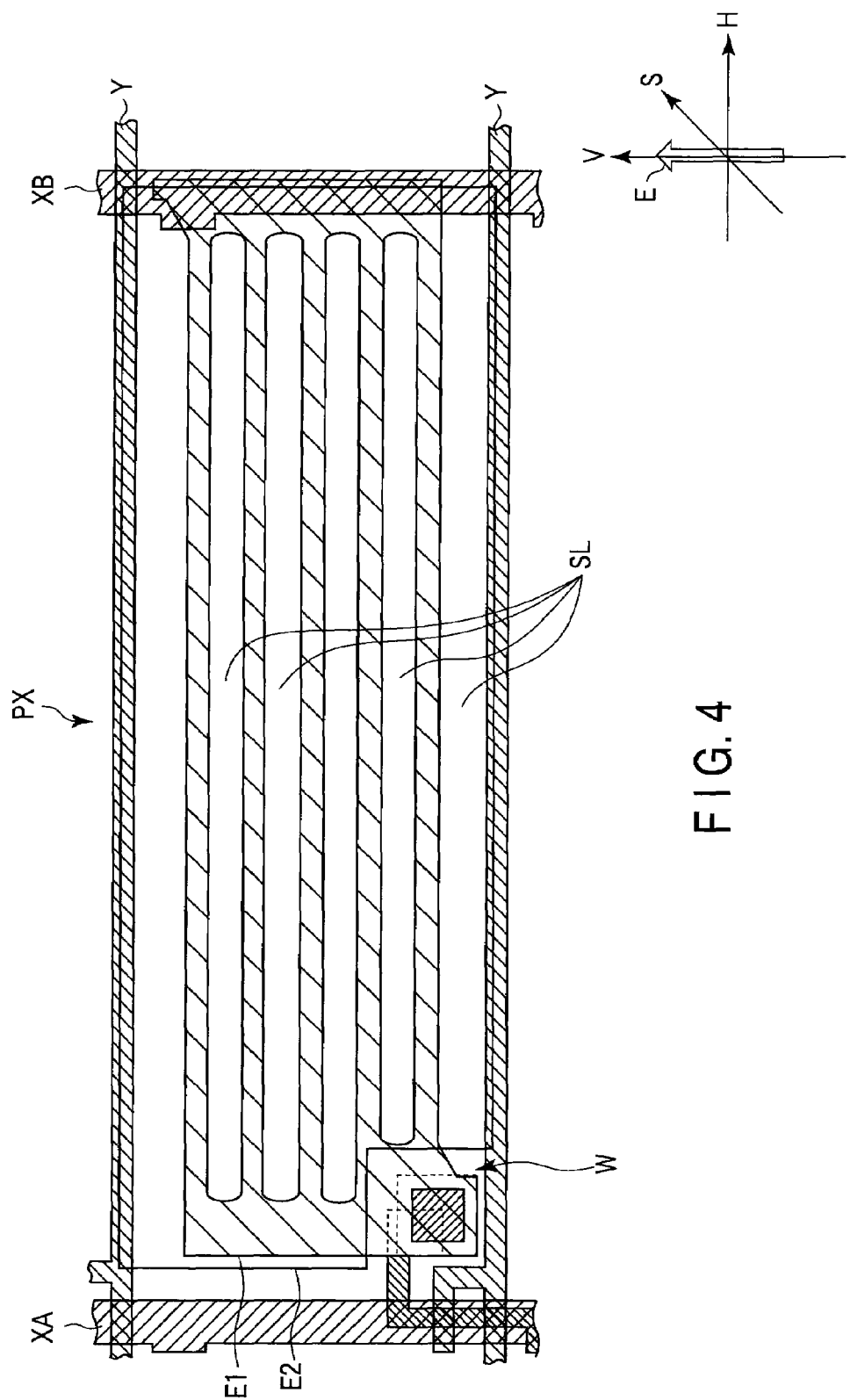
FIG. 4 is a plan view which schematically shows another example of the structure of one pixel of an array substrate, which is applicable to the liquid crystal display device shown in FIG. 1.

On the other hand, in an example shown in FIG. 4, each pixel PX has a substantially rectangular shape having a greater length in the row direction H than in the column direction V.

Specifically, the first electrode E1 is disposed between a pair of signal lines XA and XB, and has a rectangular shape which is substantially elongated in the row direction H (i.e. in the direction parallel to the direction of extension of the scanning line). As shown in FIG. 4, the first electrode E1 is so disposed as not to overlap the signal line XA in plan view. The first electrode E1 is connected to the signal line XA via the switching element W.

The first electrode E1 has a plurality of slits SL which are opposed to the second electrode E2 and are arranged in the column direction V. In this example, four slits SL are formed in the first electrode E1. Each slit SL has a major axis extending in the row direction H.

The second electrode E2 is spaced apart from the signal line XA and is disposed such that an edge on one end side thereof overlaps the signal line XB. The second electrode E2 has a rectangular shape which is substantially elongated in the row direction H. Needless to say, the second electrode E2 is so disposed as not to overlap the signal line XA. The second electrode E2 is connected to only the signal line XB.

The rubbing direction S of the alignment film is set to be a direction crossing the column direction V (e.g. a direction at 45° to the column direction). The electric field E, which is produced between the first electrode E1 and second electrode E2, is substantially parallel to the column direction V.

In the pixel PX having the above-described structure, compared to the example shown in FIG. 3, the space between the second electrode E2 and the signal line XA can be reduced. Thus, the pixel aperture ratio was about 73%. In other words, in this embodiment, the pixel aperture ratio can be more improved in the pixel shape that is elongated in the row direction H than in the pixel shape that is elongated in the column direction V.

Figure 5:
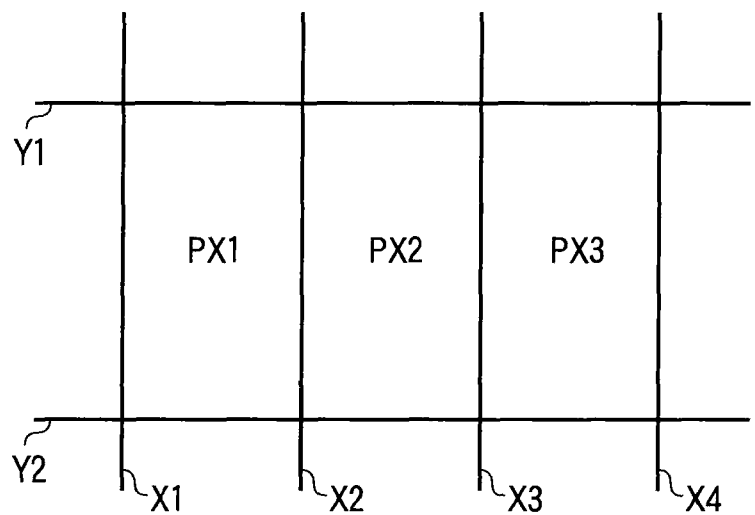
FIG. 5 is a view for explaining an example of driving in the liquid crystal display device according to the present embodiment.

Next, an example of driving of the liquid crystal display device having the above-described structure is described. For the purpose of simple description, as shown in FIG. 5, attention is paid to three pixels (PX1, PX2, PX3) of one row in the active area DSP, and a description is given of an example of driving in a normally black mode of 5V driving (i.e. a mode in which black display is effected when the potential difference is 0V, and white display is effected when the potential difference is 5V).

The pixel PX1 is disposed between the signal line X1 and signal line X2. The first electrode of the pixel PX1 is connected to the signal line X1, and the second electrode of the pixel PX1 is connected to the signal line X2. The pixel PX2 is disposed between the signal line X2 and signal line X3. The first electrode of the pixel PX2 is connected to the signal line X2, and the second electrode of the pixel PX2 is connected to the signal line X3. The pixel PX3 is disposed between the signal line X3 and signal line X4. The first electrode of the pixel PX3 is connected to the signal line X3, and the second electrode of the pixel PX3 is connected to the signal line X4.

The switching elements of the three pixels are connected to the scanning line Y1. When an ON signal (a high-level scanning signal) is supplied to the scanning line Y1, the switching elements are turned on. At this timing, a pixel potential can be written between the first electrode E1 and second electrode E2 via the signal line. For example, if attention is paid to the pixel PX2, a potential, which is supplied via the signal line X2, is written in the first electrode via the switching element, and a potential, which is supplied via the signal line X3, is written in the second electrode. The liquid crystal molecules of the pixel PX2 are driven by an electric field which is produced by the potential difference between the first electrode and the second electrode.

The switching elements of the three pixels are turned off when an OFF signal (a low-level scanning signal) is supplied to the scanning line Y1. During this period, the written pixel potential is retained. For example, if attention is paid to the pixel PX2, during the period in which the switching element is turned off, a capacitance is formed by coupling between the pixel PX2 and the signal line X3 that neighbors the pixel PX2. Even if the potential of the other signal line varies, the pixel potential of the pixel PX2 is retained.

When the pixel potential is written as described above, in each of the pixels, the potential of one signal line is set at a pixel potential which is determined with reference to the potential of the other signal line.

Figure 6A:
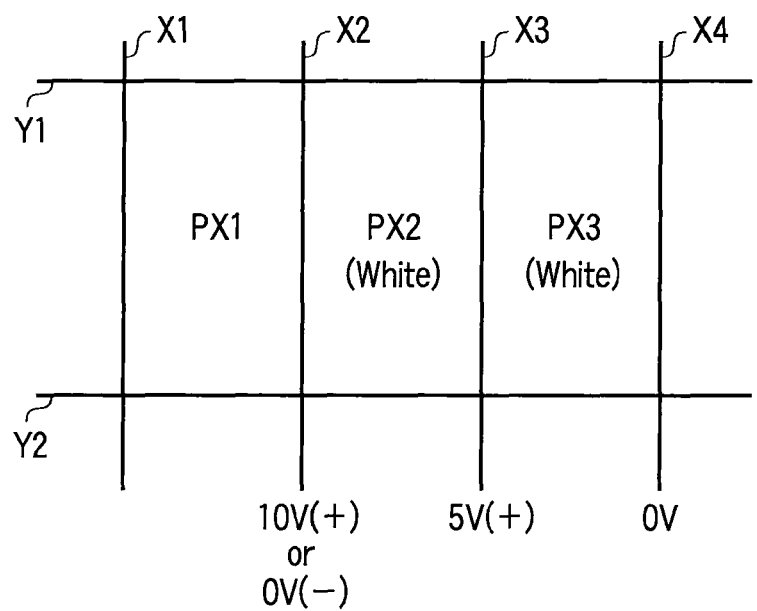
FIG. 6A is a view showing an example of driving in a case where white display is effected on neighboring pixels in a normally black mode of 5V driving shown in FIG. 5.

For example, as shown in FIG. 6A, as regards the pixel PX3, the potential of the signal line X4 is set at a reference potential, e.g. 0V, and the potential of the signal line X3 is set at 5V. Thereby, the potential difference between the first electrode and second electrode becomes 5V, and white display is effected. Similarly, as regards the pixel PX2 that neighbors the pixel PX3, the potential of the signal line X3 is set at a reference potential (5V), and the potential of the signal line X2 is set at 10V or 0V, and thereby white display is similarly effected. By setting the potential of each signal line in this manner, a desired screen display can be performed.

As shown in FIG. 6A, while the polarity of the pixel potential in the pixel PX3 is (+), the polarity of the pixel potential in the neighboring pixel PX2 may be (+) as in the case where 10V is selected, or may be (−) as in the case where 0V is selected. In general, the maximum signal amplitude can be decreased by applying a driving method, such as a V line reversal driving method or a dot reversal driving method (HV reversal driving), in which the polarity of the pixel potential of the neighboring pixel is reversed.

The polarity of the pixel potential may not regularly be reversed in one frame.

Figure 6B:
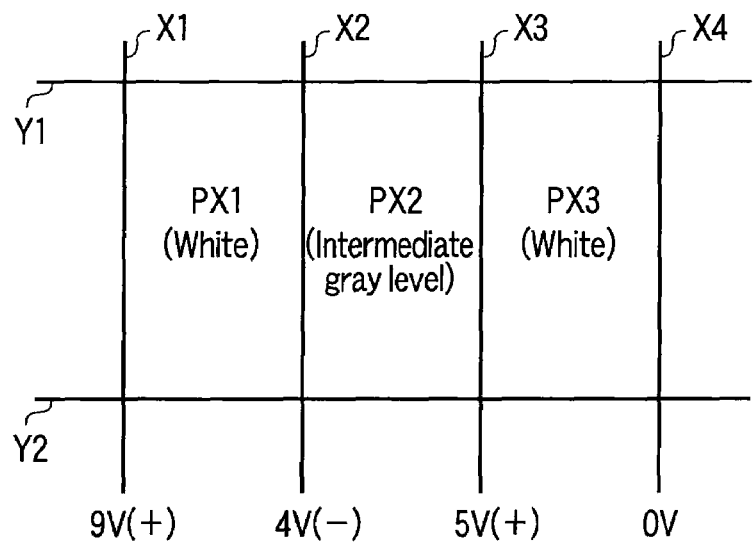
FIG. 6B shows an example of driving in a case where a pixel of an intermediate gray level is interposed between pixels which effect white display.

For example, as shown in FIG. 6B, as regards the pixel PX3, the positive polarity is selected relative to a reference potential (0V) that is the potential of the signal line X4, and the potential of the signal line X3 is set at 5V. Thereby, white display is effected. As regards the pixel PX2 that neighbors the pixel PX3, when an intermediate gray level corresponding to 1V is to be displayed, the negative polarity is selected relative to a reference potential (5V) that is the potential of the signal line X3, and the potential of the signal line X2 is set at 4V. As regards the pixel PX1 that neighbors the pixel PX2, when white display corresponding to 5V is to be displayed, if the positive polarity is selected relative to a reference potential (4V) that is the potential of the signal line X2, the potential of the signal line X1 becomes 9V. Consequently, there is a tendency that the maximum signal amplitude increases.

Figure 6C:
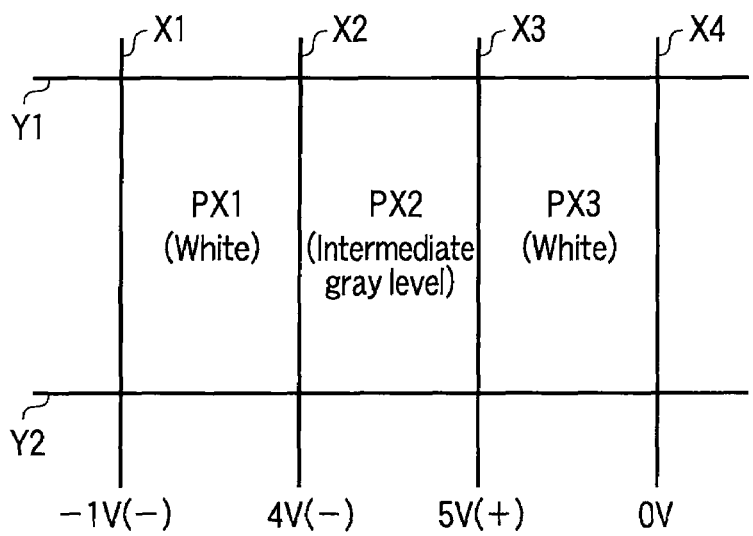
FIG. 6C shows another example of driving in a case where a pixel of an intermediate gray level is interposed between pixels which effect white display.

Taking the above into account, as shown in FIG. 6C, no regularity is given to the polarity of the pixel potential. As regards the pixel PX1, when white display corresponding to 5V is to be displayed, the negative polarity is selected relative to the reference potential (4V) that is the potential of the signal line X2. Thereby, the potential of the signal line X1 becomes −1V. By this driving method, an increase of the maximum signal amplitude can be suppressed.

Specifically, the signal line driver XD sets the voltage (or the polarity of pixel potential), which is to be supplied to each signal line, so as not to exceed the maximum signal amplitude that can be output, on the basis of the potential of the neighboring signal line, the pixel potential of the neighboring pixel, etc. For example, when the pixel potential of a certain pixel is to be set, the signal line driver XD selects the polarity of the pixel potential so that the voltage, which is supplied to the signal line relative to the reference potential, may not exceed an upper-limit threshold voltage VsigH (e.g. 5V) and may not fall below a lower-limit threshold voltage VsigL (e.g. −5V). Alternatively, the signal line driver XD may select a polarity on a side toward an intermediate driving voltage Vsigc (e.g. 2.5V).

In the next frame, however, it is preferable to reverse the polarity so as to avoid a display defect such as image sticking.

For example, at the time of the next frame, the signal line X3 is set at −5V, the signal line X2 is set at −4V and the signal line X1 is set at 1V, relative to 0V of the signal line X4. Thereby, the polarity can be reversed, without varying the display of the pixels PX1 to PX3.

Although the potential of the signal line X4 is the reference potential, the potential of the signal line X4 may not necessarily be a DC potential, and may be changed to an arbitrary voltage at the time of the next write (next frame). For example, as regards the voltage of the next frame, the signal line X4 is set at 5V, the signal line X3 is set at 0V relative to the reference potential that is the potential of the signal line X4, the signal line X2 is set at 1V, and the signal line X1 is set at 6V. Thereby, without varying the display of the pixels PX1 to PX3, only the polarity can be reversed.

Thereby, the load on the driver can be reduced, and a sufficient margin of breakdown voltage can be secured. Moreover, an inexpensive driver is applicable, contributing to reduction in cost.

The present invention is not limited directly to the above-described embodiment. In practice, the structural elements can be modified and embodied without departing from the spirit of the invention. Various inventions can be made by properly combining the structural elements disclosed in the embodiment. For example, some structural elements may be omitted from all the structural elements disclosed in the embodiment. Furthermore, structural elements in different embodiments may properly be combined.

What is claimed is:

1. A liquid crystal display device which is configured to hold a liquid crystal layer between a first substrate and a second substrate, wherein:
the first substrate comprises:
scanning lines; and
a first signal line, a second signal line, and a third signal line, which intersect with the scanning lines,
wherein
a first pixel between the first signal line and the second signal line includes, on the first substrate, a first upper electrode which is connected to the first signal line, and a first lower electrode which is opposed to the first upper electrode via an interlayer insulation film and is connected to the second signal line, a second pixel between the second signal line and the third signal line includes, on the first substrate, a second upper electrode which is connected to the second signal line, and a second lower electrode which is opposed to the second upper electrode via the interlayer insulation film and is connected to the third signal line, and one of the first lower electrode and the second upper electrode is connected to the second signal line via a switching element, and the other one of the first lower electrode and the second upper electrode is connected directly to the second signal line without being connected via a switching element, and a pixel potential of the first pixel being set with reference to a pixel potential of the second pixel.

2. The liquid crystal display device according to claim 1, wherein a potential of the first signal lines is set at a pixel potential which is determined with reference to a potential of the second signal line.

3. The liquid crystal display device according to claim 2, wherein a polarity of the pixel potential is selected in such a manner as not to exceed an upper-limit threshold voltage VsigH and not to fall below a lower-limit threshold voltage VsigL.

4. The liquid crystal display device according to claim 1, wherein the first pixel forms a capacitance by coupling with the second signal line.

5. The liquid crystal display device according to claim 1, wherein
the first pixel includes a switching element which is ON/OFF controlled on the basis of a scanning signal which is supplied to the scanning line, and
the first upper electrode is connected to the first signal line via the switching element.

6. The liquid crystal display device according to claim 1, wherein the first upper electrode is disposed between the first signal line and the second signal line.

7. The liquid crystal display device according to claim 1, wherein the first lower electrode is spaced apart from the first signal line, overlaps the second signal line, and is electrically connected to the second signal line.

8. The liquid crystal display device according to claim 1, wherein the first upper electrode is disposed on the interlayer insulation film and includes a slit which is opposed to the first lower electrode.

9. The liquid crystal display device according to claim 1, wherein each of the pixels has a rectangular shape having a greater length in the row direction than in the column direction.

10. The liquid crystal display device according to claim 1, wherein an edge of the other one of the first lower electrode and the second upper electrode overlaps and contacts the second signal line.

11. A liquid crystal display device which is configured to hold a liquid crystal layer between a first substrate and a second substrate, wherein
the first substrate comprises:
scanning lines, a first signal line, a second signal line, and a third signal line which intersect with the scanning lines;
a first upper electrode which is disposed between the first signal line and the second signal line and is connected to the first signal line;
a first lower electrode which is opposed to the first upper electrode via an interlayer insulation film and is connected to the second signal line;
a second upper electrode which is disposed between the second signal line and the third signal line and is connected to the second signal line; and
a second lower electrode which is opposed to the second upper electrode via the interlayer insulation film and is connected to the third signal line,
wherein one of the first lower electrode and the second upper electrode is connected to the second signal line via a first switching element, and the other one of the first lower electrode and the second upper electrode is connected directly to the second signal line without being connected via a switching element.

12. The liquid crystal display device according to claim 11, wherein the first substrate further comprises a second switching element which is connected to one of the scanning lines and the first signal line and is interposed between the first signal line and the first upper electrode.

13. The liquid crystal display device according to claim 11, wherein the first upper electrode includes a slit which is opposed to the first lower electrode, and the second upper electrode includes a slit which is opposed to the second lower electrode.

14. The liquid crystal display device according to claim 11, wherein the first lower electrode includes an edge which comes in contact with the second signal line, and the second lower electrode includes an edge which comes in contact with the third signal line.

15. A liquid crystal display device which is configured to hold a liquid crystal layer between a first substrate and a second substrate, wherein
the first substrate comprises:
scanning lines;
a first interlayer insulation film which covers the scanning lines;
a first signal line, a second signal line, and a third signal line which are disposed on the first interlayer insulation film and intersect with the scanning lines;
a first lower electrode and a second lower electrode which are disposed on the first interlayer insulation film, the first lower electrode being spaced apart from the first signal line and connected to the second signal line, and the second lower electrode being spaced apart from the second signal line and connected to the third signal line;
a second interlayer insulation film which covers the first to the third signal lines and the first to the second lower electrodes; and
a first upper electrode and a second upper electrode which are disposed on the second interlayer insulation film, the first upper electrode being opposed to the first lower electrode and connected to the first signal line, and the second upper electrode being opposed to the second lower electrode and connected to the second signal line,
wherein one of the first lower electrode and the second upper electrode is connected to the second signal line via a first switching element, and the other one of the first lower electrode and the second upper electrode is connected directly to the second signal line without being connected via a switching element.

16. The liquid crystal display device according to claim 15, wherein the first substrate further comprises a second switching element which is connected to one of the scanning lines and the first signal line and is interposed between the first signal line and the first upper electrode.

17. The liquid crystal display device according to claim 15, wherein the first upper electrode includes a slit which is opposed to the first lower electrode, and the second upper electrode includes a slit which is opposed to the second lower electrode.

18. The liquid crystal display device according to claim 15, wherein the first lower electrode includes an edge which comes in contact with the second signal line, and the second lower electrode includes an edge which comes in contact with the third signal line.

* * * * *